(12) United States Patent
Watanabe

(10) Patent No.: US 11,298,860 B2
(45) Date of Patent: Apr. 12, 2022

(54) GOLF BALL AND METHOD OF MANUFACTURE

(71) Applicant: BRIDGESTONE SPORTS CO., LTD, Tokyo (JP)

(72) Inventor: Hideo Watanabe, Saitamaken (JP)

(73) Assignee: BRIDGESTONE SPORTS CO., LTD, Tokyo (JP)

( * ) Notice: Subject to any disclaimer, the term of this patent is extended or adjusted under 35 U.S.C. 154(b) by 4 days.

(21) Appl. No.: 16/871,121

(22) Filed: May 11, 2020

(65) Prior Publication Data

US 2020/0368949 A1 Nov. 26, 2020

(30) Foreign Application Priority Data

May 23, 2019 (JP) .............................. JP2019-096976

(51) Int. Cl.

| | |
|---|---|
| A63B 37/06 | (2006.01) |
| B29C 45/14 | (2006.01) |
| B29C 45/26 | (2006.01) |
| B29C 45/00 | (2006.01) |
| B29C 45/27 | (2006.01) |
| B29K 609/00 | (2006.01) |
| A63B 37/00 | (2006.01) |
| B29L 31/54 | (2006.01) |
| B29K 75/00 | (2006.01) |

(52) U.S. Cl.
CPC .... *B29C 45/14819* (2013.01); *B29C 45/0001* (2013.01); *B29C 45/0053* (2013.01); *B29C 45/14065* (2013.01); *B29C 45/14778* (2013.01); *B29C 45/263* (2013.01); *B29C 45/2708* (2013.01); *A63B 37/0033* (2013.01); *A63B 37/0044* (2013.01); *A63B 37/0045* (2013.01); *A63B 37/0047* (2013.01); *A63B 37/0063* (2013.01); *A63B 37/0065* (2013.01); *A63B 37/0075* (2013.01); *A63B 37/0076* (2013.01); *B29C 2045/0079* (2013.01); *B29K 2075/00* (2013.01); *B29K 2609/00* (2013.01); *B29K 2995/007* (2013.01); *B29K 2995/0046* (2013.01); *B29L 2031/546* (2013.01)

(58) Field of Classification Search
CPC ............................ A63B 45/00; A63B 37/0023
USPC ......................................................... 473/409
See application file for complete search history.

(56) References Cited

U.S. PATENT DOCUMENTS

| | | | | |
|---|---|---|---|---|
| 6,024,551 | A | * | 2/2000 | Yamaguchi ....... B29C 45/14819 |
| | | | | 264/278 |
| 2014/0175699 | A1 | * | 6/2014 | Kasashima ........ B29D 99/0042 |
| | | | | 264/278 |
| 2019/0160344 | A1 | * | 5/2019 | Sajima ............... A63B 37/0021 |

FOREIGN PATENT DOCUMENTS

| | | | |
|---|---|---|---|
| JP | 4098034 | B2 | 6/2008 |
| JP | 4173766 | B2 | 10/2008 |
| JP | 4188245 | B2 | 11/2008 |
| JP | 4188246 | B2 | 11/2008 |

(Continued)

*Primary Examiner* — Raeann Gorden
(74) *Attorney, Agent, or Firm* — Sughrue Mion, PLLC

(57) ABSTRACT

A method for manufacturing a golf ball having a core, an intermediate layer and a cover that is formed of a resin material composed primarily of a polyurethane resin and has a thickness of 0.1 mm to 0.7 mm by injection molding the cover using a vertically separating two-part injection mold having specific gate and support pin configurations. This method enables a relatively soft urethane resin cover that is thin and of high quality to be formed, and has a good golf ball productivity.

2 Claims, 4 Drawing Sheets

(56) References Cited

FOREIGN PATENT DOCUMENTS

JP  4188247 B2  11/2008
JP  4206341 B2  1/2009

\* cited by examiner

90° ROTATION

GOLF BALL AND METHOD OF MANUFACTURE

CROSS-REFERENCE TO RELATED APPLICATION

This non-provisional application claims priority under 35 U.S.C. § 119(a) on Patent Application No. 2019-096976 filed in Japan on May 23, 2019, the entire contents of which are hereby incorporated by reference.

TECHNICAL FIELD

The present invention relates to a golf ball for professional golfers and skilled amateur golfers which has a relatively soft and thin urethane resin cover, and to a method for manufacturing such a golf ball.

BACKGROUND ART

Recently, given the importance placed on excellent spin properties in the short game, professional golfers and skilled amateur golfers often use golf balls having a relatively soft urethane cover. However, compared with balls that use a hard cover made of an ionomeric resin as the cover material, such golf balls have a higher spin rate on full shots, sometimes resulting in a poor distance. One way of addressing this problem has been to design a multi-piece solid golf ball which has a soft outer cover layer that is thin and which uses a harder material in the intermediate layer, thereby holding down the spin rate on full shots and achieving a longer distance.

However, when polyurethane resin is molded as a thin layer, given the way in which conventional injection molds are constructed, either the resin is unable to properly and uniformly fill the mold cavity or the spherical insert over which the resin is injection-molded, such as an intermediate layer-encased sphere, shifts off-center within the mold cavity, making it impossible to form a thin cover of high quality.

Art relating to methods for manufacturing golf balls having a urethane cover is described in, for example, JP Nos. 4188245, 4206341, 4188246, 4188247, 4098034 and 4173766.

SUMMARY OF THE INVENTION

It is therefore an object of the present invention to provide, in a method for manufacturing multi-piece solid golf balls having a relatively thin urethane resin cover, a method which is able to form a thin cover of high quality and has a high golf ball mass productivity.

In the manufacture of golf balls having a cover made of a relatively soft urethane resin that is thinly formed so as to enable professional golfers and skilled amateurs to hold down the spin rate on full shots and thus obtain a long distance and also to provide excellent spin properties in the short game, the invention constituted as described below makes it possible to achieve the foregoing object by using in an underlying intermediate layer a material that is harder than the urethane resin cover and also by, when injecting the urethane resin material into an injection mold cavity, optimizing the surface area and number of gates provided for filling the cavity so as to be able to stably introduce the resin material even when the flow channels are designed for forming a thin cover.

Accordingly, the invention provides a method for manufacturing a golf ball having a core, an intermediate layer and a cover, the cover being formed of a resin material composed primarily of a polyurethane resin and having a thickness of at least 0.1 mm and up to 0.7 mm, which method includes the step of injection molding the cover over a spherical insert consisting of the core encased by the intermediate layer with a vertically separating two-part injection mold having an upper mold half and a lower mold half that removably mate at a parting line to form a spherical cavity defined by a cavity wall, a plurality of gates for introducing the cover-forming resin material into the spherical cavity and three or more support pins for supporting the spherical insert within the spherical cavity. Each support pin is disposed so as to be advanceable and retractable in a direction perpendicular to the mold parting line. Six or more of the gates are formed along the mold parting line, each such gate having a surface area where the gate meets the wall of the spherical cavity of 1.25 to 2.70 mm$^2$.

In a preferred embodiment of the manufacturing method of the invention, each support pin has at an end thereof a cross-sectional shape with a surface area of at least 17 mm$^2$.

In another preferred embodiment of the inventive manufacturing method, the upper mold half or lower mold half by itself has four or more support pins.

In yet another preferred embodiment, the upper mold half or lower mold half by itself has six or more support pins.

In still another preferred embodiment, each support pin is disposed in such a way that the angle of intersection between an axis connecting top and bottom poles of the mold and a normal directed from a center on the axis and toward the cavity wall where the support pin retreats is from 15 to 30°.

Advantageous Effects of the Invention

The golf ball manufacturing method of the invention is able to form a relatively soft urethane resin cover that is thin and of good quality, and moreover has a good golf ball productivity.

BRIEF DESCRIPTION OF THE DIAGRAMS

DESCRIPTION OF THE PREFERRED EMBODIMENTS

Figure 1A:
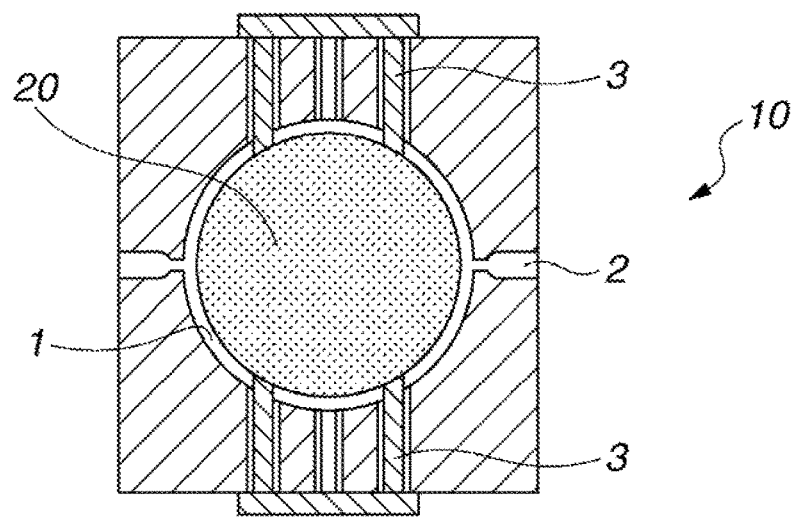
FIGS. 1A-1C show schematic views of a cover-forming injection mold according to one embodiment of the invention, FIG. 1A depicting the state of the mold prior to injection molding, FIG. 1B depicting the mold as it is being filled with a resin material, and FIG. 1C depicting the mold after it has been filled with the resin material.

The objects, features and advantages of the invention will become more apparent from the following detailed description taken in conjunction with the appended diagrams.

The manufacturing method of the invention is a method for producing a multi-piece solid golf ball having a core, an intermediate layer and a cover, which cover is formed of a resin material composed primarily of polyurethane resin.

The core is typically formed of a single layer or a plurality of layers of rubber material. Specifically, a rubber composition can be produced using a base rubber as the primary ingredient and blending with this other ingredients such as a co-crosslinking agent, an organic peroxide, an inert filler and an organic sulfur compound. It is preferable to use a polybutadiene as the base rubber.

The core has a deflection when compressed under a final load of 1,275 N (130 kgf) from an initial load of 98 N (10 kgf) which, although not particularly limited, is preferably at least 2.5 mm, more preferably at least 2.7 mm, and even more preferably at least 3.0 mm. The upper limit is preferably not more than 6.0 mm, more preferably not more than 5.0 mm, and even more preferably not more than 4.0 mm. When the core deflection is too small, i.e., when the core is too hard, the spin rate of the ball may rise excessively, resulting in a poor distance, or the feel at impact may be too hard. On the other hand, when the core deflection is too large, i.e., when the core is too soft, the ball rebound may be too low, resulting in a poor distance, the feel at impact may be too soft, or the durability to cracking on repeated impact may worsen.

It is desirable to try optimizing at least the center and surface hardnesses of the core in the following way.

The core center hardness (Cc) is preferably at least 52, more preferably at least 56, and even more preferably at least 60. The upper limit is preferably not more than 69, more preferably not more than 67, and even more preferably not more than 65. When this value is too large, the feel at impact may become harder or the spin rate on full shots may rise, as a result of which the intended distance may not be achieved. On the other hand, when this value is too small, the rebound may become low, resulting in a poor flight, or the durability to cracking on repeated impact may worsen.

The core surface hardness (Cs) is preferably at least 86, more preferably at least 88, and even more preferably at least 90. The upper limit is preferably not more than 98, more preferably not more than 97, and even more preferably not more than 96. Hardnesses outside of this range may lead to undesirable results similar to those described above for the core center hardness (Cc).

The difference between the core surface hardness (Cs) and the core center hardness (Cc) is preferably at least 25, more preferably at least 28, and even more preferably at least 30. The upper limit is preferably not more than 35, more preferably not more than 34, and even more preferably not more than 33. When this value is too small, the ball spin rate-lowering effect on shots with a driver may be inadequate, resulting in a poor distance. When this value is too large, the ball initial velocity on shots may become low, resulting in a poor distance, or the durability to cracking on repeated impact may worsen.

The core hardnesses mentioned above are Shore C hardnesses. These Shore C hardnesses are values measured with a Shore C durometer in general accordance with ASTM D2240.

The core can be produced by vulcanizing and curing the rubber composition containing the above ingredients. For example, the core can be produced by intensive mixture using a Banbury mixer, roll mill or other mixing apparatus followed by the use of a core mold to compression-mold or injection-mold and then cure the rubber composition.

Next, the intermediate layer encasing the core is described.

The material forming the intermediate layer may be any of various types of thermoplastic resin used in golf ball cover materials. The use of an ionomeric resin is especially preferred.

A commercial product may be used as the ionomeric resin. Alternatively, the intermediate layer-forming resin material that is used may be one obtained by blending, of commercially available ionomeric resins, a high-acid ionomeric resin having an acid content of at least 18 wt % with a conventional ionomeric resin.

It is desirable to abrade the surface of the intermediate layer in order to increase adhesion of the intermediate layer material with the polyurethane that is used in the subsequently described cover material. In addition, it is desirable to apply a primer (adhesive) to the surface of the intermediate layer following such abrasion treatment or to add an adhesion reinforcing agent to the intermediate layer material.

The intermediate layer material has a specific gravity which is typically less than 1.1, preferably between 0.90 and 1.05, and more preferably between 0.93 and 0.99. Outside of this range, the rebound of the overall ball may decrease and a good distance may not be obtained, or the durability of the ball to cracking on repeated impact may worsen.

The intermediate layer has a material hardness on the Shore D scale which, although not particularly limited, is preferably at least 60, more preferably at least 62, and even more preferably at least 63. The upper limit is preferably not more than 72, more preferably not more than 70, and even more preferably not more than 68. The surface hardness of the sphere obtained by encasing the core with the intermediate layer (referred to below as the "intermediate layer-encased sphere" or the "spherical insert"), expressed on the Shore D scale, is preferably at least 66, more preferably at least 68, and even more preferably at least 69. The upper limit is preferably not more than 78, more preferably not more than 76, and even more preferably not more than 74. When the material hardness and surface hardness of the intermediate layer are lower than the above respective ranges, the spin rate on full shots may rise excessively, resulting in a poor distance. On the other hand, when the material hardness and surface hardness are too high, the durability to cracking on repeated impact may worsen or the feel at impact may worsen.

The intermediate layer has a thickness of preferably at least 0.8 mm, more preferably at least 1.0 mm, and even more preferably at least 1.1 mm. The upper limit in the intermediate layer thickness is preferably not more than 1.7 mm, more preferably not more than 1.55 mm, and even more preferably not more than 1.4 mm. It is preferable for the intermediate layer to have a greater thickness than the cover. When the intermediate layer thickness falls outside of the above range or the intermediate layer is formed so as to be thinner than the cover, the ball spin rate-lowering effect on shots with a driver (W #1) may be inadequate and a good distance may not be achieved. Also, when the intermediate layer is too thin, the durability of the ball to cracking on repeated impact may worsen; when the intermediate layer is too thick, the feel at impact may become harder.

The intermediate layer-encased sphere has a diameter of preferably at least 41.3 mm, more preferably at least 41.4 mm, and even more preferably at least 41.5 mm. The upper limit of this diameter is preferably not more than 42.5 mm, more preferably not more than 42.1 mm, and even more preferably not more than 41.7 mm. When this diameter is too small, the spin rate on shots with a driver (W #1) may rise, as a result of which the desired distance may not be achieved. On the other hand, when this diameter is too large, the durability of the ball to repeated impact may worsen, or the feel at impact may worsen.

Formation of the intermediate layer can be carried out by a customary method such as a known injection molding process. For example, the intermediate layer-encased sphere can be obtained by injection-molding the intermediate layer material over the core in an injection mold. Alternatively, the intermediate layer-encased sphere can be produced by enclosing the core within two intermediate layer half-cups that have been pre-molded into hemispherical shapes and then molding under applied heat and pressure.

Next, the cover is described.

In the present invention, the cover-forming resin material is composed primarily of a polyurethane resin. In particular, from the standpoint of the mass productivity of the manufactured balls, use can be made of a thermoplastic polyurethane. More specifically, it is preferable to form the cover of, as the polyurethane resin, a resin blend in which the main components are (I) a thermoplastic polyurethane and (II) a polyisocyanate compound.

The thermoplastic polyurethane (I) has a structure which includes soft segments composed of a polymeric polyol (polymeric glycol) that is a long-chain polyol, and hard segments composed of a chain extender and a polyisocyanate compound. Here, the long-chain polyol serving as a starting material may be any that has hitherto been used in the art relating to thermoplastic polyurethanes, and is not particularly limited. Illustrative examples include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. These long-chain polyols may be used singly, or two or more may be used in combination. Of these, in terms of being able to synthesize a thermoplastic polyurethane having a high rebound resilience and excellent low-temperature properties, a polyether polyol is preferred.

Any chain extender that has hitherto been employed in the art relating to thermoplastic polyurethanes may be suitably used as the chain extender. For example, low-molecular-weight compounds with a molecular weight of 400 or less which have on the molecule two or more active hydrogen atoms capable of reacting with isocyanate groups are preferred. Illustrative, non-limiting, examples of the chain extender include 1,4-butylene glycol, 1,2-ethylene glycol, 1,3-butanediol, 1,6-hexanediol and 2,2-dimethyl-1,3-propanediol. Of these, the chain extender is preferably an aliphatic diol having 2 to 12 carbon atoms, and more preferably 1,4-butylene glycol.

Any polyisocyanate compound hitherto employed in the art relating to thermoplastic polyurethanes may be suitably used without particular limitation as the polyisocyanate compound. For example, use can be made of one or more selected from the group consisting of 4,4'-diphenylmethane diisocyanate, 2,4-toluene diisocyanate, 2,6-toluene diisocyanate, p-phenylene diisocyanate, xylylene diisocyanate, 1,5-naphthylene diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. However, depending on the type of isocyanate, the crosslinking reactions during injection molding may be difficult to control. In the practice of the invention, to provide a balance between stability at the time of production and the properties that are manifested, it is most preferable to use the following aromatic diisocyanate: 4,4'-diphenylmethane diisocyanate.

Commercially available products may be used as the thermoplastic polyurethane serving as component (I). Illustrative examples include Pandex T-8295, Pandex T-8290 and Pandex T-8260 (all from DIC Covestro Polymer, Ltd.).

A thermoplastic elastomer other than the above thermoplastic polyurethanes may also be optionally included as a separate component, referred to herein as "component (III)," together with above components (I) and (II). By including this component (III) in the above resin blend, the flowability of the resin blend can be further improved and properties required of the golf ball cover material, such as resilience and scuff resistance, can be enhanced.

The compositional ratio of above components (I), (II) and (III) is not particularly limited. However, to fully elicit the advantageous effects of the invention, the compositional ratio (I):(II):(III) is preferably in the weight ratio range of from 100:2:50 to 100:50:0, and more preferably from 100:2:30 to 100:30:0.

In addition, various additives other than the foregoing ingredients may be optionally included in this resin blend. For example, pigments, dispersants, antioxidants, light stabilizers, ultraviolet absorbers and internal mold lubricants may be suitably included.

The cover has a material hardness on the Shore D scale which, although not particularly limited, is preferably at least 25, more preferably at least 30, and even more preferably at least 35. The upper limit is preferably not more than 48, more preferably not more than 45, and even more preferably not more than 43. The Shore C hardness is preferably at least 43, more preferably at least 50, and even more preferably at least 57. The upper limit is preferably 74 or less, more preferably 70 or less, and even more preferably 67 or less. When the cover material is too soft, the spin rate on shots with a driver (W #1) may rise and a good distance may not be obtained. When the cover material is too hard, the ball may not be receptive to spin in the short game, which may worsen the short game playability, or the scuff resistance may be poor.

The Shore D value obtained by subtracting the material hardness of the cover from the material hardness of the intermediate layer is preferably at least 15, more preferably at least 18, and even more preferably at least 20. The upper limit is preferably 40 or less, more preferably 35 or less, and even more preferably 30 or less. When this value is too small, the spin rate on full shots may rise, resulting in a poor distance. On the other hand, when this value is too large, the durability to cracking on repeated impact may worsen or the cover may cut more easily when the ball is topped.

The cover has a thickness of at least 0.1 mm, preferably at least 0.3 mm, and more preferably at least 0.5 mm. The upper limit in the cover thickness is 0.7 mm or less, preferably 0.65 mm or less, and more preferably 0.6 mm or less. When the cover is too thick, the spin rate of the ball may rise or the ball initial velocity may decrease, as a result of which a good distance may not be achieved. When the cover is too thin, the ball may be less receptive to spin in the short game or the scuff resistance may worsen. Also, during injection molding of the cover, the resin material may not spread uniformly throughout the cavity, making good productivity difficult to achieve.

In the present invention, the cover material is injection-molded with a vertically separating two-part injection mold. Using this injection mold, the polyurethane resin serving as the cover-forming resin material is heated to a given temperature and injected in a molten state between a spherical insert—typically an intermediate layer-encased sphere—that has been placed within a spherical cavity of the mold and the wall of the spherical cavity, thereby molding the cover-forming resin material.

Figure 1B:
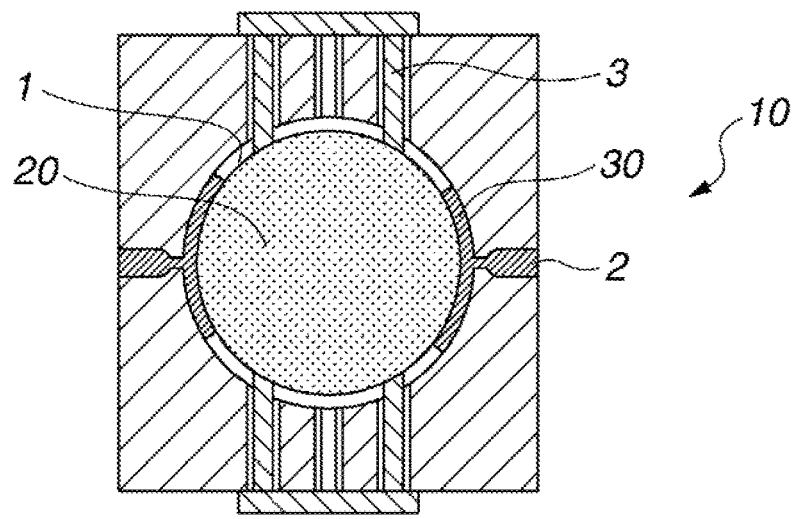
Figure 1C:
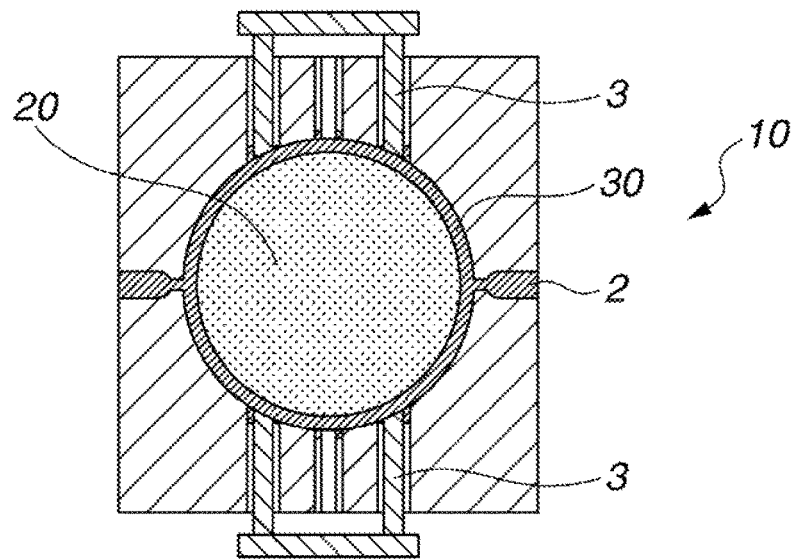

The injection mold used in this invention has an upper mold half and a lower mold half that removably mate at a parting line to form a spherical cavity defined by a cavity wall, a plurality of gates for introducing the cover-forming resin material into the spherical cavity, and a plurality of support pins for supporting a spherical insert within the spherical cavity, each support pin being disposed so as to be advanceable and retractable in a direction perpendicular to the mold parting line. In one embodiment of the invention, shown in FIG. 1, an injection mold 10 having a spherical cavity 1, a given number of gates 2 and a given number of support pins 3 is used, with a molten resin material 30 being made to flow through the gates 2 and into the cavity 1 where a spherical insert 20 such as an intermediate layer-encased sphere over which the cover is to be formed is supported by the support pins 3. FIG. 1A is a schematic diagram showing the mold interior prior to injection molding; this shows a state in which the intermediate layer-encased sphere 20 is supported by the support pins 3. FIG. 1B is a schematic diagram of the mold interior during introduction of a resin material 30 into the mold 10, and FIG. 1C is a schematic diagram showing the mold 10 once the resin material 30 has filled the mold interior and injection molding is complete. The support pins 3 that support the spherical insert 20 within the spherical cavity 1 gradually retract as the molten resin material 30 fills the interior of the spherical cavity 1, each support pin 3 retreating so as to be flush with the cavity wall just before filling of the molten resin material 30 into the cavity 1 is fully complete, after which filling of the resin material 30 is completed. Although not shown in the diagrams, runners for feeding the cover material are arranged at the position of the mold parting line in such a way as to encircle the cavity, and gates that open out radially toward the cavity from this runner are circumferentially disposed as described below.

Six or more such gates are formed along the mold parting line. The number of these gates is preferably at least seven, and more preferably at least eight. The upper limit in the number of gates is preferably 14 or less, more preferably 12 or less, and even more preferably 10 or less. In the embodiment shown in FIG. 2, six gates 2 are evenly disposed along the parting line. When the number of gates is smaller than the specified range, the resin material does not flow well around the spherical insert and fully spread throughout the cavity, as a result of which the molded cover ends up being thinner near the poles and it may even be impossible to completely cover the core, leaving it in a partially uncovered state.

In order to have the resin material spread uniformly within the cavity so as to form a thin, high-quality cover, it is preferable to circumferentially arrange the gates at equal intervals along the parting line.

Figure 2:
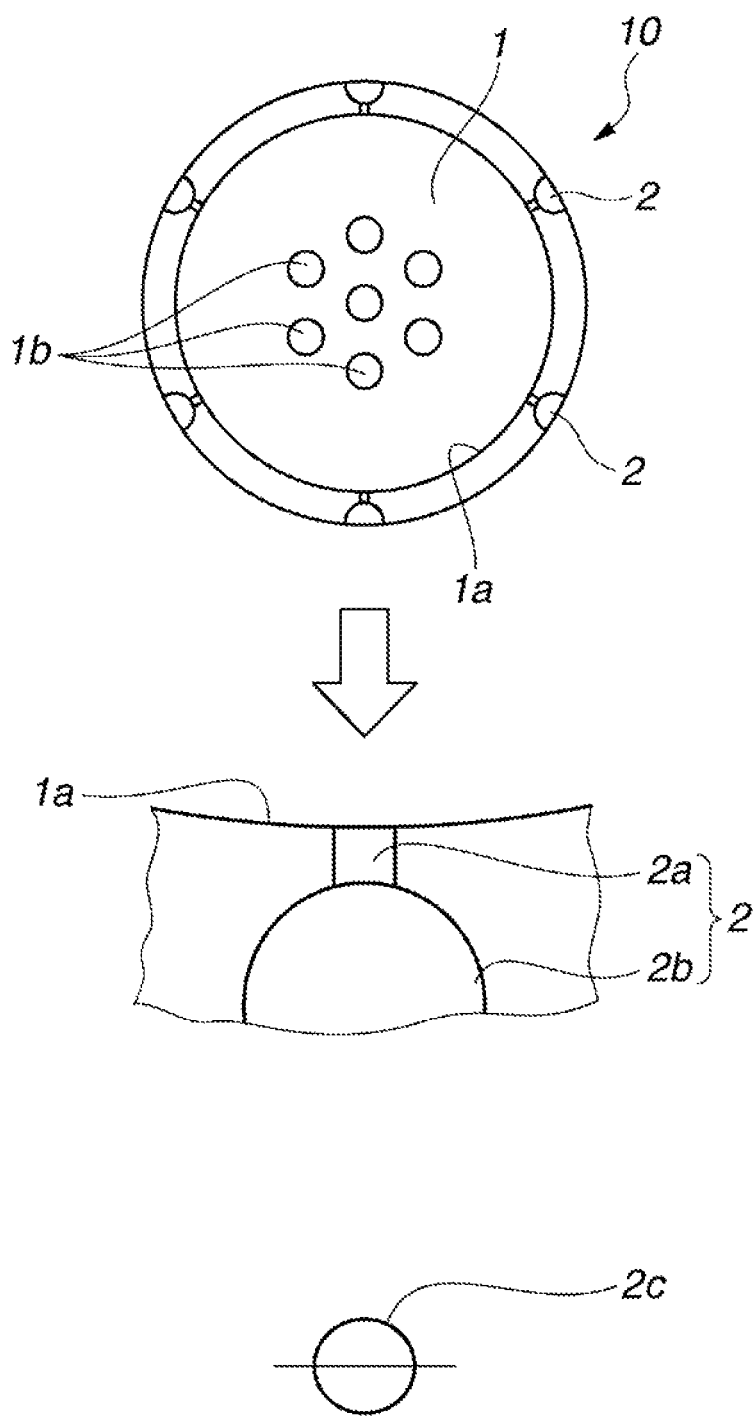
FIG. 2 is a schematic view showing the arrangement of gates within the mold.

Generally, referring to FIG. 2, when viewing the mold 10 from directly above, it is preferable for the gates 2 to be formed with a large outside portion 2b and a small inside portion 2a. In this invention, the inside portion 2a of each gate 2 is generally circular at the gate orifice 2c where it meets the mold cavity wall 1a. This gate orifice 2c has a cross-sectional surface area that is from 1.25 to 2.70 mm$^2$. The orifice surface area at this portion of the gate is preferably at least 1.35 mm$^2$, and more preferably at least 1.50 mm$^2$. The upper limit is preferably not more than 2.50 mm$^2$, and more preferably not more than 2.30 mm$^2$. When the orifice surface area is too small, the cover-forming resin material is unable to fully spread throughout the interior of the cavity, which may result in the molded cover being thin near the poles or make it impossible to completely cover the core, leaving it in a partially uncovered state. On the other hand, when this orifice surface area is too large, the rate at which the cover-forming resin material flows around the spherical insert to the polar areas may be too rapid, as a result of which the ball diameter after molding may be larger at the poles than at the seam.

The support pins that are disposed so as to be advanceable and retractable in a direction perpendicular to the mold parting line are typically three or more support pins arranged at given intervals (such as three pins at 120° intervals) along a circle centered on the poles of the spherical cavity. These support pins, which are disposed so as to be advanceable and retractable within holes of circular cross-section in the top and bottom mold halves, operate in such a way that, as shown in FIG. 1A, when the support pins 3 have advanced into the cavity 1, they hold the intermediate layer-encased sphere 20 in place while the cover-forming resin material 30 is filled into the cavity 1, after which the support pins 3 can be retracted to the position of the cavity wall. It is desirable to optimize the number and diameter of the support pin holes (diameter of the support pin ends) in order to minimize deformation of the intermediate layer-encased sphere that has been placed within the cavity and stably position the core at the center of the cavity while the cavity is being filled with the resin material. It should be noted that the diameter of the support pin holes is not the diameter of the cross-section obtained by cutting the support pin perpendicular to its axis, but rather the diameter of the planar shape that follows the contour at the leading end of the support pin.

The mold has preferably at least four support pins, more preferably at least six support pins, and more preferably at least eight support pins, in the upper mold half or lower mold half by itself. The upper limit in this number is preferably 12 or less, more preferably 10 or less, and even more preferably 9 or less. Outside this range in the number of support pins, it may be difficult to minimize deformation of the intermediate layer-encased sphere and render the cover-forming resin material to a uniform thickness throughout the space between the intermediate layer-encased sphere and the cavity wall while holding the intermediate layer-encased sphere at the center of the cavity.

The ends of the support pins, although not necessarily limited, generally have a circular or elliptical cross-sectional shape. The surface area of this cross-section is preferably at least 17 mm$^2$, more preferably at least 23 mm$^2$, and even more preferably at least 25 mm$^2$. The surface area has an upper limit that is preferably 42 mm$^2$ or less, more preferably 36 mm$^2$ or less, and even more preferably 32 mm$^2$ or less.

Figure 3:
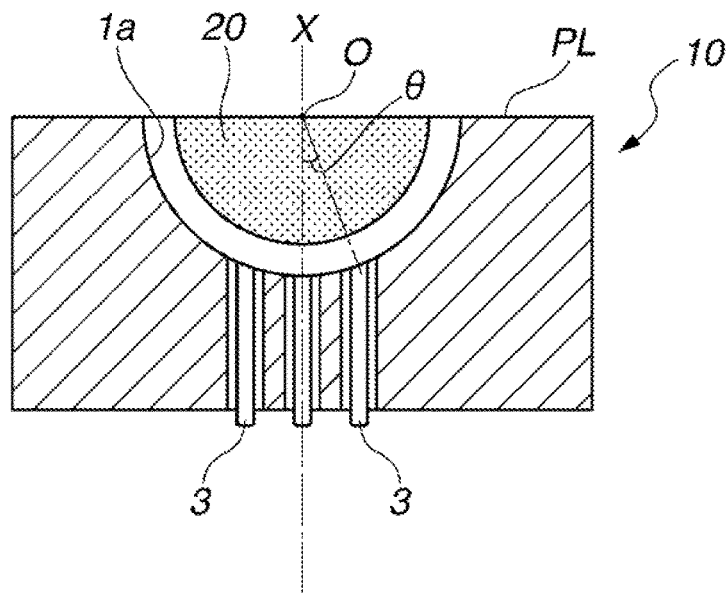
FIG. 3 is a schematic cross-sectional view showing the positions of support pins disposed in the mold.

In addition, with regard to the positions at which the support pins are disposed, referring to FIG. 3, it is preferable for each support pin 3 to be disposed in such a way that the angle of intersection θ between an axis X connecting top and bottom poles of the mold and a normal directed from a center O on the axis X and toward the cavity wall 1a where the support pin retracts is from 15 to 30°. This angle θ is more preferably at least 18°, and even more preferably at least 20°. The upper limit is preferably 28° or less, and more preferably 25° or less. Outside of this range in the angle θ, it may be difficult to minimize deformation of the intermediate layer-encased sphere 20 and render the cover-forming resin material to a uniform thickness throughout the space between the intermediate layer-encased sphere 20 and the cavity wall 1a while holding the intermediate layer-encased sphere 20 at the center O of the cavity.

Numerous dimples may be formed on the outside surface of the cover. These dimples can generally be formed, when the cover is injection molded, by means of numerous dimple-shaped projections formed on the spherical cavity wall of the injection mold. The number of dimples arranged on the surface of the cover is preferably at least 250, more preferably at least 300, and even more preferably at least 320. The upper limit is preferably not more than 380, more preferably not more than 350, and even more preferably not more than 340. When the number of dimples is higher than this range, the ball trajectory may become lower and the distance traveled by the ball may decrease. On the other hand, when the number of dimples is lower that this range, the ball trajectory may become higher and a good distance may not be achieved.

The dimple shapes used may be of one type or may be a combination of two or more types suitably selected from among, for example, circular shapes and non-circular shapes such as elliptical shapes, various polygonal shapes and dewdrop shapes. When circular dimples are used, the dimple diameter may be set to from about 2.5 mm to about 6.5 mm, and the dimple depth may be set to from 0.08 mm and up to 0.30 mm.

In order for the aerodynamic properties of the dimples to be fully manifested, it is desirable for the dimple coverage ratio on the spherical surface of the golf ball, i.e., the dimple surface coverage SR, which is the sum of the individual dimple surface areas, each defined by the flat plane circumscribed by the edge of the dimple, as a percentage of the spherical surface area of the ball were the ball to have no dimples thereon, to be set to from 70 to 90%. Also, to optimize the ball trajectory, it is desirable for the value $V_0$, defined as the spatial volume of the individual dimples below the flat plane circumscribed by the dimple edge, divided by the volume of the cylinder whose base is the flat plane and whose height is the maximum depth of the dimple from the base, to be set to from 0.35 to 0.80. Moreover, it is preferable for the ratio VR of the sum of the volumes of the individual dimples, each formed below the flat plane circumscribed by the edge of the dimple, with respect to the volume of the ball sphere were the ball surface to have no dimples thereon, to be set to from 0.6% to 1.0%. Outside of the above ranges in these respective values, the resulting trajectory may not enable a good distance to be achieved and so the ball may fail to travel a fully satisfactory distance.

A coating layer is formed on the surface of the cover. This coating layer can be applied using various types of coating materials. Because the coating layer must be capable of enduring the harsh conditions of golf ball use, it is desirable to use a coating composition in which the chief component is a urethane coating composed of a polyol and a polyisocyanate.

The polyol is exemplified by acrylic polyols and polyester polyols. These polyols include modified polyols. Other polyols may also be added to further improve the ease of carrying out the coating operation.

The acrylic polyol is exemplified by homopolymers and copolymers of monomers having functional groups that react with isocyanate. Such monomers are exemplified by alkyl esters of (meth)acrylic acid, illustrative examples of which include methyl (meth)acrylate, ethyl (meth)acrylate, isopropyl (meth)acrylate, butyl (meth)acrylate, isobutyl (meth)acrylate, 2-ethylhexyl (meth)acrylate, lauryl (meth) acrylate, stearyl (meth)acrylate, cyclohexyl (meth)acrylate, isobornyl (meth)acrylate, 2-hydroxyethyl (meth)acrylate, 2-hydroxypropyl (meth)acrylate and 4-hydroxybutyl (meth) acrylate. These may be used singly or two or more may be used together.

Modified acrylic polyols that may be used include polyester-modified acrylic polyols. Examples of other polyols include polyether polyols such as polyoxyethylene glycol (PEG), polyoxypropylene glycol (PPG) and polyoxytetramethylene glycol (PTMG); condensed polyester polyols such as polyethylene adipate (PEA), polybutylene adipate (PBA) and polyhexamethylene adipate (PH2A); lactone-type polyester polyols such as poly-ε-caprolactone (PCL); and polycarbonate polyols such as polyhexamethylene carbonate. These may be used singly or two or more may be used together. The ratio of these polyols to the total amount of acrylic polyol is preferably not more than 50 wt %, and more preferably not more than 40 wt %.

Polyester polyols are obtained by the polycondensation of a polyol with a polybasic acid. Examples of the polyol include diols such as ethylene glycol, 1,2-propanediol, 1,3-propanediol, 1,3-butanediol, 1,4-butanediol, 1,6-hexanediol, neopentyl glycol, diethylene glycol, dipropylene glycol, hexylene glycol, dimethylol heptane, polyethylene glycol and polypropylene glycol; and also triols, tetraols, and polyols having an alicyclic structure. Examples of the polybasic acid include aliphatic dicarboxylic acids such as succinic acid, adipic acid, sebacic acid, azelaic acid and dimer acid; aliphatic unsaturated dicarboxylic acids such as fumaric acid, maleic acid, itaconic acid and citraconic acid; aromatic polycarboxylic acids such as phthalic acid, isophthalic acid, terephthalic acid, trimellitic acid and pyromellitic acid; dicarboxylic acids having an alicyclic structure, such as tetrahydrophthalic acid, hexahydrophthalic acid, 1,3-cyclohexanedicarboxylic acid, 1,4-cyclohexanedicarboxylic acid and endomethylene tetrahydrophthalic acid; and tris-2-carboxyethyl isocyanurate.

It is suitable to use two types of polyester polyols together as the polyol component. Letting the two types of polyester polyols be component A and component B, a polyester polyol in which a cyclic structure has been introduced onto the resin skeleton may be used as the polyester polyol of component A. Examples include polyester polyols obtained by the polycondensation of a polyol having an alicyclic structure, such as cyclohexane dimethanol, with a polybasic acid; and polyester polyols obtained by the polycondensation of a polyol having an alicyclic structure with a diol or triol and a polybasic acid. A polyester polyol having a branched structure may be used as the polyester polyol of component B. Examples include polyester polyols having a branched structure, such as NIPPOLAN 800 from Tosoh Corporation.

The weight-average molecular weight (Mw) of the overall base resin consisting of the above two types of polyester polyols is preferably from 13,000 to 23,000, and more preferably from 15,000 to 22,000. The number-average molecular weight (Mn) of the overall base resin consisting of these two types of polyester polyols is preferably from 1,100 to 2,000, and more preferably from 1,300 to 1,850. Outside of these ranges in the average molecular weights (Mw and Mn), the wear resistance of the coating layer may decrease. The weight-average molecular weight (Mw) and the number-average molecular weight (Mn) are polystyrene-equivalent measured values obtained by gel permeation chromatography (GPC) using differential refractometry.

The contents of these two types of polyester polyol (A) and (B) are not particularly limited, although the content of component A is preferably from 20 to 30 wt % of the total amount of base resin and the content of component B is preferably from 2 to 18 wt % of the total amount of base resin.

The polyisocyanate is exemplified, without particular limitation, by commonly used aromatic, aliphatic, alicyclic and other polyisocyanates. Specific examples include tolylene diisocyanate, diphenylmethane diisocyanate, xylylene diisocyanate, tetramethylene diisocyanate, hexamethylene diisocyanate, lysine diisocyanate, isophorone diisocyanate, 1,4-cyclohexylene diisocyanate, naphthalene diisocyanate, trimethylhexamethylene diisocyanate, dicyclohexylmethane diisocyanate and 1-isocyanato-3,3,5-trimethyl-4-isocyanatomethylcyclohexane. These may be used singly or in admixture.

Modified forms of hexamethylene diisocyanate include, for example, polyester-modified hexamethylene diisocyanate and urethane-modified hexamethylene diisocyanate. Derivatives of hexamethylene diisocyanate include isocyanurates, biurets and adducts of hexamethylene diisocyanate.

The molar ratio of isocyanate (NCO) groups on the polyisocyanate to hydroxyl (OH) groups on the polyol, expressed as NCO/OH, should be in the range of 0.5 to 1.5, and is preferably from 0.8 to 1.2, and more preferably from 1.0 to 1.2. At less than 0.5, unreacted hydroxyl groups remain, which may adversely affect the performance and water resistance of the coating layer. On the other hand, at above 1.5, the number of isocyanate groups becomes excessive and urea groups (which are fragile) form in reactions with the moisture, as a result of which the coating layer performance may decline.

An amine catalyst or an organometallic catalyst may be used as the curing catalyst (organometallic compound). Examples of such organometallic compounds include soaps of metals such as aluminum, nickel, zinc or tin. Preferred use can be made of those which have hitherto been formulated as curing agents for two-part curing urethane coatings.

Depending on the coating conditions, various types of organic solvents may be mixed into the coating composition. Examples of such organic solvents include aromatic solvents such as toluene, xylene and ethylbenzene; ester solvents such as ethyl acetate, butyl acetate, propylene glycol methyl ether acetate and propylene glycol methyl ether propionate; ketone solvents such as acetone, methyl ethyl ketone, methyl isobutyl ketone and cyclohexanone; ether solvents such as diethylene glycol dimethyl ether, diethylene glycol diethyl ether and dipropylene glycol dimethyl ether; alicyclic hydrocarbon solvents such as cyclohexane, methyl cyclohexane and ethyl cyclohexane; and petroleum hydrocarbon solvents such as mineral spirits.

Known coating ingredients may be optionally added to the paint composition. For example, thickeners, ultraviolet absorbers, fluorescent brighteners, slip agents and pigments may be included in suitable amounts.

The thickness of the coating layer composed of the coating composition, although not particularly limited, is typically from 5 to 40 μm, and preferably from 10 to 20 μm. As used herein, "coating layer thickness" refers not to the coating layer that forms within the dimples, but to the thickness of the coat that forms on the ball surface in non-dimple areas (also referred to as "lands").

In this invention, the coating layer made of the above coating composition has an elastic work recovery that is preferably at least 60%, and more preferably at least 80%. At a coating layer elastic work recovery in this range, the coating layer has a high elasticity and so the self-repairing ability is high, resulting in an outstanding abrasion resistance. Moreover, the performance attributes of golf balls coated with this coating composition can be improved. The method of measuring the elastic work recovery is described below.

The elastic work recovery is one parameter of the nanoindentation method for evaluating the physical properties of coating layers, this being a nanohardness test method that controls the indentation load on a micro-newton (μN) order and tracks the indenter depth during indentation to a nanometer (nm) precision. In prior methods, only the size of the deformation (plastic deformation) mark corresponding to the maximum load could be measured. However, in the nanoindentation method, the relationship between the indentation load and the indentation depth can be obtained by continuous automated measurement. This eliminates the problem up until now of individual differences between observers when visually measuring a deformation mark under an optical microscope, enabling the physical properties of the coating layer to be measured to a high precision. Given that the coating layer on the ball surface is strongly affected by the impact of drivers and various other clubs and has a not inconsiderable influence on various golf ball properties, measuring the coating layer by the nanohardness test method and carrying out such measurement to a higher precision than in the past is a very effective method of evaluation.

When using the above coating composition, a coating layer can be formed on the surfaces of golf balls manufactured by a commonly known method, via the steps of preparing the coating composition at the time of application, applying the composition to the golf ball surface by a conventional coating operation, and drying. The coating method is not particularly limited. For example, suitable use can be made of spray painting, electrostatic painting or dipping.

The hardness of the coating layer, expressed on the Shore M hardness scale, is preferably at least 40, and more preferably at least 60. The upper limit is preferably not more than 95, and more preferably not more than 85. This Shore M hardness is obtained in general accordance with ASTM D2240. The hardness of the coating layer, expressed on the Shore C hardness scale, is preferably at least 40, and more preferably at least 53. The upper limit is preferably not more than 80, and more preferably not more than 73. This Shore C hardness is obtained in general accordance with ASTM D2240. At a coating layer hardness that is higher than this range, the coat may become brittle when the ball is repeatedly struck, which may make it incapable of protecting the cover layer. On the other hand, coating layer hardnesses that are lower than the above range are undesirable because the ball surface scuffs more readily upon striking a hard object.

The difference between the material hardness (Shore C hardness) of the cover and the Shore C hardness of the coating layer is preferably ±15 or less, more preferably ±10 or less, and even more preferably ±5 or less. When this difference is too large, the coating layer tends to peel when repeatedly struck. Also, the ball lacks spin receptivity on approach shots, in addition to which the spin rate on full shots rises, sometimes resulting in a shorter distance.

The golf ball has a deflection when compressed under a final load of 130 kgf from an initial load of 10 kgf which is preferably at least 2.0 mm, more preferably at least 2.15 mm, and even more preferably at least 2.3 mm. The upper limit is preferably 3.5 mm or less, more preferably 3.0 mm or less, and even more preferably 2.7 mm or less. When this value is too small, the feel at impact may become too hard and, particularly on full shots with an iron, the spin rate may rise excessively, resulting in a poor distance. On the other hand, when this value is too large, the feel at impact may become too soft and, particularly on shots with a driver (W #1) at a head speed (HS) of 45 m/s or more, the initial velocity may be low, as a result of which a good distance may not be obtained.

Ball specifications such as the ball mass (weight) and diameter may be suitably set according to the Rules of Golf.

EXAMPLES

The following Examples and Comparative Examples are provided to illustrate the invention, and are not intended to limit the scope thereof.

Examples 1 to 3, Comparative Examples 1 to 4

Single-layer cores were produced in the same way in all the Examples and Comparative Examples by preparing the rubber core composition shown in Table 1, and then molding/vulcanizing the composition under vulcanization conditions of 155° C. and 15 minutes.

TABLE 1

| Core composition | Parts by weight |
|---|---|
| Polybutadiene A | 80 |
| Polybutadiene B | 20 |
| Zinc acrylate | 43 |
| Organic peroxide | 1.0 |
| Water | 1.2 |
| Antioxidant | 0.1 |
| Barium sulfate | 10.9 |
| Zinc oxide | 4.0 |
| Zinc salt of pentachlorothiophenol | 0.3 |

Details on the ingredients mentioned in Table 1 are given below.
Polybutadiene A: Available under the trade name "BR 01" from JSR Corporation
Polybutadiene B: Available under the trade name "BR 51" from JSR Corporation
Zinc acrylate: Available as "ZN-DA85S" from Nippon Shokubai Co., Ltd.
Organic Peroxide: Dicumyl peroxide, available under the trade name "Percumyl D" from NOF Corporation
Antioxidant: 2,2-Methylenebis(4-methyl-6-butylphenol), available under the trade name "Nocrac NS-6" from Ouchi Shinko Chemical Industry Co., Ltd.
Barium Sulfate: Baryte powder available as "Barico #100" from Hakusui Tech
Zinc oxide: Available as "Zinc Oxide Grade 3" from Sakai Chemical Co., Ltd.
Zinc salt of pentachlorothiophenol: Available from Wako Pure Chemical Industries, Ltd.

An intermediate layer was formed by injection-molding Resin Material No. I formulated as shown in Table 2 over the core, thereby giving an intermediate layer-encased sphere. Next, a cover (outermost layer) was formed by injection-molding Urethane Resin Material II formulated as shown in Table 2 over the intermediate layer-encased sphere. Table 5 shows the injection mold configurations (gates and support pins) for each Example and Comparative Example. In the respective Examples and Comparative Examples, the gates are arranged circumferentially at equal intervals along the mold parting line (six gates are shown arranged at equal intervals in FIG. 2). In each Example and Comparative Example, referring to FIG. 3, the support pins 3 are each disposed at a position where the angle of intersection θ between the axis X connecting the top and bottom poles of the mold and a normal directed from the center O on the axis X and toward the cavity wall 1a where the support pin 3 retreats is 20.75°.

TABLE 2

| Resin composition (pbw) | I | II |
|---|---|---|
| Himilan 1706 | 35 | |
| Himilan 1557 | 15 | |
| Himilan 1605 | 50 | |
| T-8283 | | 100 |
| Silicone wax | | 0.5 |
| Polyethylene wax | | 1.0 |
| Isocyanate compound | | 6.3 |
| Titanium oxide | | 3.3 |
| Trimethylolpropane (TMP) | 1.1 | |

Trade names for the chief materials in Table 2 are given below.
Himilan ®: Ionomers available from Dow-Mitsui Polychemicals Co., Ltd.
T-8283: Ether-type thermoplastic polyurethane available under the trade name Pandex ® from DIC Covestro Polymer, Ltd.
Polyethylene wax: Available under the trade name "Sanwax 161P" from Sanyo Chemical Industries, Ltd.
Isocyanate compound: 4,4-Diphenylmethane diisocyanate
Titanium oxide: Available from Sakai Chemical Industry Co., Ltd.

Formation of Dimples

Figure 4:
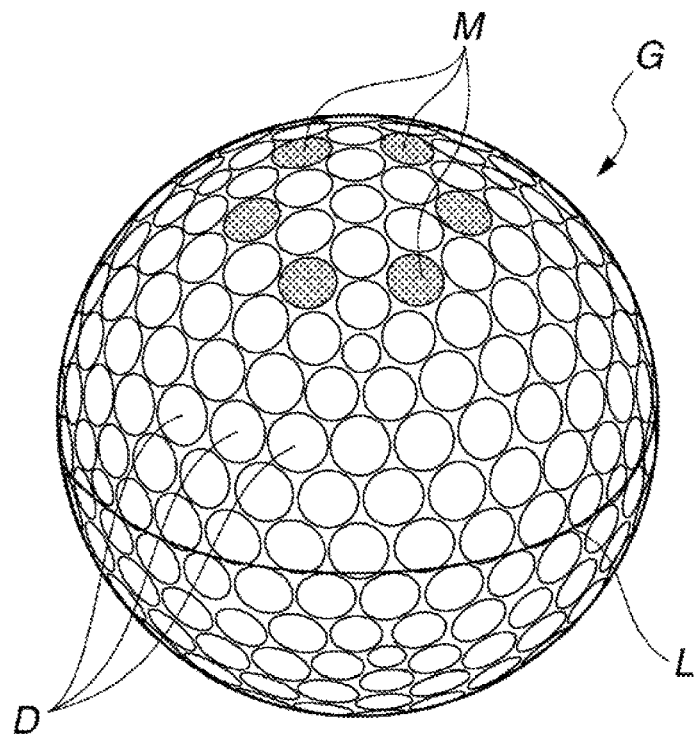
FIG. 4 is a plan view of a golf ball having the dimple configuration used in the Examples of the invention.

A combination of the four types of circular dimples shown in Table 3 below, collectively referred to here as "Family A" dimples, was formed on the surface of each golf ball and was common to all the Examples and Comparative Examples. FIG. 4 shows a golf ball G on which these dimples are arranged. In this diagram, D represents dimples, L represents a seam line corresponding to the parting line of the injection mold, and M represents supporting pin positions.

TABLE 3

| | Family A | | | |
|---|---|---|---|---|
| Type of dimple | No. 1 | No. 2 | No. 3 | No. 4 |
| Number | 240 | 72 | 12 | 14 |
| Diameter (mm) | 4.3 | 3.8 | 2.8 | 4.0 |
| Depth at deepest point (mm) | 0.15 | 0.16 | 0.17 | 0.16 |
| SR (%) | 80 | | | |
| VR (%) | 0.9 | | | |

SR: Sum of surface areas of individual dimples, each defined by the flat plane circumscribed by the edge of the dimple, as a percentage of spherical surface area of ball were the ball to have no dimples thereon (units, %)
VR: Sum of volumes of individual dimples, each formed below the flat plane circumscribed by the edge of the dimple, as a ratio with respect to volume of ball sphere were the ball to have no dimples thereon (units, %)

Formation of Coating Layer

Next, Coating Composition No. I shown in Table 3 below, as a coating composition common to all the Examples and Comparative Examples, was applied with an air spray gun onto the cover (outermost layer) surface on which numerous dimples had been formed, thereby producing golf balls having a 15 μm-thick coating layer thereon.

TABLE 4

| Coating composition No. 1 (pbw) | Base resin | Polyester Polyol A | 23 |
|---|---|---|---|
| | | Polyester Polyol B | 15 |
| | | Organic solvent | 62 |
| | Curing agent | Isocyanate (HMDI isocyanurate) | 42 |
| | | Solvent | 58 |
| | Molar blending ratio (NCO/OH) | | 0.89 |
| Coat properties | Elastic work recovery (%) | | 84 |
| | Shore M hardness | | 84 |
| | Shore C hardness | | 63 |
| | Thickness (μm) | | 15 |

Polyester Polyol (A) Synthesis Example

A reactor equipped with a reflux condenser, a dropping funnel, a gas inlet and a thermometer was charged with 140 parts by weight of trimethylolpropane, 95 parts by weight of ethylene glycol, 157 parts by weight of adipic acid and 58 parts by weight of 1,4-cyclohexanedimethanol, following which the temperature was raised to between 200 and 240° C. under stirring and the reaction was effected by 5 hours of heating. This yielded Polyester Polyol A having an acid value of 4, a hydroxyl value of 170 and a weight-average molecular weight (Mw) of 28,000.

Next, Polyester Polyol A synthesized above was dissolved in butyl acetate, thereby preparing a varnish having a nonvolatiles content of 70 wt %.

The base resin for Coating Composition I in Table 4 was prepared by mixing 23 parts by weight of the above polyester polyol solution together with 15 parts by weight of Polyester Polyol B (the saturated aliphatic polyester polyol NIPPOLAN 800 from Tosoh Corporation; weight-average molecular weight (Mw), 1,000; 100% solids) and the organic solvent. This mixture had a nonvolatiles content of 38.0 wt %.

Elastic Work Recovery

The elastic work recovery of the coating material was measured using a sheet of the coating material having a thickness of 50 μm. The ENT-2100 nanohardness tester from Erionix Inc. was used as the measurement apparatus, and the measurement conditions were as follows.

Indenter: Berkovich indenter (material: diamond; angle α: 65.03°)

Load F: 0.2 mN
Loading time: 10 seconds
Holding time: 1 second
Unloading time: 10 seconds The elastic work recovery was calculated as follows, based on the indentation work $W_{elast}$ (Nm) due to springback deformation of the coat and on the mechanical indentation work $W_{total}$ (Nm).

Elastic work recovery=$W_{elast}/W_{total} \times 100(\%)$

Shore C Hardness and Shore M Hardness

The Shore C hardnesses and Shore M hardnesses in Table 4 above were determined by fabricating the material to be tested into 2 mm thick sheets and stacking three such sheets together to form test specimens. Measurements were taken using a Shore C durometer and a Shore M durometer in accordance with ASTM D2240.

Various properties of the resulting golf balls, including the core hardness profile, the thicknesses and material hardnesses of the respective layers, the surface hardnesses of the core, the intermediate layer-encased sphere and the ball, and the deflections of the core, the intermediate layer-encased sphere and the ball under specific loading were evaluated by the following methods. The results are presented in Table 5.

Diameters of Core and Intermediate Layer-Encased Sphere

Figure 5:
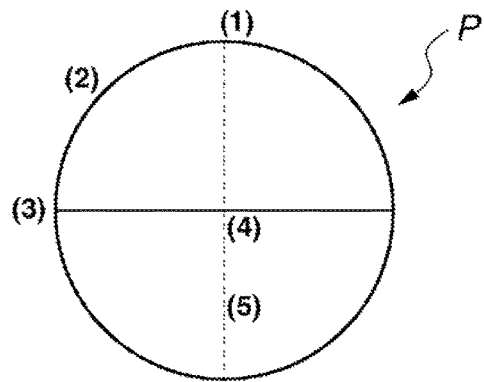
FIG. 5 is an explanatory view illustrating a method of measuring the diameter of a core or an intermediate layer-encased sphere.

After isothermally holding the spheres to be measured at 23.9±1° C. for at least 3 hours, the diameter at each of five places (1) to (5) on the surface of sphere P in FIG. 5 was measured by Steps A to D below, the average of these values was treated as the measurement for one sphere, and the average for ten measured spheres was determined. The numbers (1) to (5) at the respective points are indicated in FIG. 5 as circled numbers.

A. Measure the diameters starting at the pole position (1) and continuing up to position (3) at equal intervals.

B. After measuring the diameter at position (3), rotate the sphere 90°.

C. Measure the diameters at positions (4) and (5).

D. Determine the average of the measurements at positions (1) to (5) and treat this value as the sphere diameter.

Deflections of Core, Intermediate Layer-Encased Sphere and Ball

A sphere (i.e., a core, an intermediate layer-encased sphere or a ball) was placed on a hard plate and the deflection of the sphere when compressed under a final load of 130 kgf from an initial load of 10 kgf was measured. The deflection refers in each case to the measured value obtained after holding the test specimen isothermally at 23.9° C. The instrument used was a high-load compression tester available from MU Instruments Trading Corporation. Measurement was carried out with the pressing head moving downward at a speed of 4.7 mm/s.

Core Hardness Profile

The indenter of a durometer was set substantially perpendicular to the spherical surface of the core, and the surface hardness of the core on the Shore C hardness scale was measured in accordance with ASTM D2240. The core center hardness was measured by perpendicularly pressing the indenter of a durometer against the center portion in the flat cross-sectional plane obtained by cutting the core into hemispheres. Measurement results are indicated as Shore C hardness values.

Material Hardnesses (Shore C and Shore D Hardnesses) of Intermediate Layer and Cover The resin materials for each layer were molded into sheets having a thickness of 2 mm and left to stand for at least two weeks, following which the Shore C and Shore D hardnesses were measured in accordance with ASTM D2240.

Cover Thickness

The "nominal thickness" of the cover, "thickness T1 at poles" and "thickness T2 at seam" are shown in Table 5. These were measured as described below (units, mm).

"nominal thickness"=(ball diameter−diameter of intermediate layer-encased sphere)/2    (i)

Figure 6:
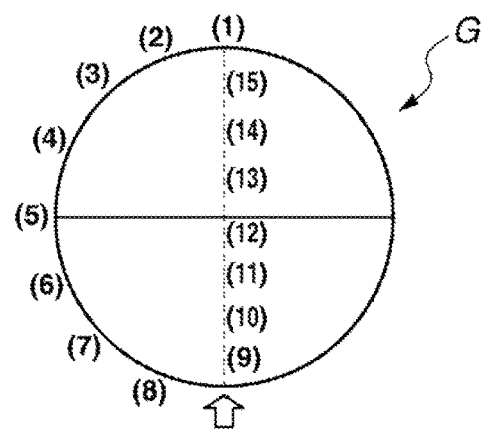
FIG. 6 is an explanatory view illustrating a method of measuring the ball diameter.
Figure 6:
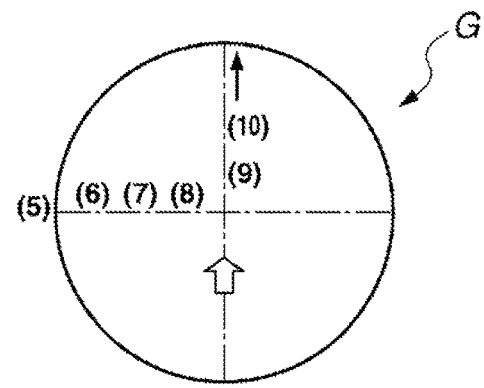

"thickness T1 at poles"=[(diameter of ball at position (1) in FIG. 6)−(diameter of intermediate layer-encased sphere)]/2    (ii)

"thickness T2 at seam"=[(average value of diameters at positions (5) and (12) of ball in FIG. 6)−(diameter of intermediate layer-encased sphere)]/2    (iii)

Measurement at the above various points on the ball is explained in the "Ball Diameter" section below. The numbers (1) to (15) at the various points in FIG. 6 are indicated as circled numbers.

TABLE 5

| | | | Example | | | Comparative Example | | | |
|---|---|---|---|---|---|---|---|---|---|
| | | | 1 | 2 | 3 | 1 | 2 | 3 | 4 |
| Mold cavity when forming cover | Gate orifices (inside) | Diameter (mm) | 1.0 | 1.0 | 1.2 | 0.7 | 1.5 | 1.0 | 1.2 |
| | | Surface area (mm²) | 1.57 | 1.57 | 2.26 | 0.77 | 3.53 | 1.57 | 2.26 |
| | | Number | 6 | 8 | 8 | 8 | 8 | 6 | 4 |

TABLE 5-continued

|  |  |  | Example | | | Comparative Example | | | |
| --- | --- | --- | --- | --- | --- | --- | --- | --- | --- |
|  |  |  | 1 | 2 | 3 | 1 | 2 | 3 | 4 |
|  | Support pins | Diameter (mm) | 4.3 | 4.3 | 4.3 | 4.3 | 4.3 | 4.3 | 4.3 |
|  |  | Surface area (mm$^3$) | 29.04 | 29.04 | 29.04 | 29.04 | 29.04 | 29.04 | 29.04 |
|  |  | Number on one side of cavity | 6 | 6 | 6 | 6 | 6 | 6 | 6 |
| Cover | Material |  | II | II | II | II | II | II | II |
|  | Nominal thickness (mm) |  | 0.60 | 0.60 | 0.60 | 0.60 | 0.60 | 1.00 | 0.60 |
|  | Cover thickness at poles (T1) (mm) |  | 0.58 | 0.60 | 0.62 | 0.50 | 0.68 | 0.60 | 0.30 |
|  | Cover thickness at seam (T2) (mm) |  | 0.62 | 0.60 | 0.58 | 0.70 | 0.52 | 0.60 | 0.70 |
|  | T1 − T2 (mm) |  | 0.04 | 0.00 | 0.04 | 0.20 | 0.16 | 0.00 | 0.40 |
| Construction |  |  | 3-piece | 3-piece | 3-piece | 3-piece | 3-piece | 3-piece | 3-piece |
| Core | Diameter (mm) |  | 38.64 | 38.64 | 38.64 | 38.64 | 38.64 | 38.64 | 38.64 |
|  | Weight (g) |  | 35.16 | 35.16 | 35.16 | 35.16 | 35.16 | 35.16 | 35.16 |
|  | Deflection (mm) |  | 3.18 | 3.18 | 3.18 | 3.18 | 3.18 | 3.18 | 3.18 |
|  | Surface hardness (Cs) | (Shore C) | 95.4 | 95.4 | 95.4 | 95.4 | 95.4 | 95.4 | 95.4 |
|  | Hardness at midpoint between core center and surface (Cm) |  | 68.5 | 68.5 | 68.5 | 68.5 | 68.5 | 68.5 | 68.5 |
|  | Center hardness (Cc) | (Shore C) | 63.9 | 63.9 | 63.9 | 63.9 | 63.9 | 63.9 | 63.9 |
|  | Surface hardness − Center hardness (Cs − Cc) |  | 31.5 | 31.5 | 31.5 | 31.5 | 31.5 | 31.5 | 31.5 |
| Intermediate layer | Material |  | I | I | I | I | I | I | I |
|  | Thickness (mm) |  | 1.4 | 1.4 | 1.4 | 1.4 | 1.4 | 1.0 | 1.4 |
|  | Material hardness | (Shore D) | 64 | 64 | 64 | 64 | 64 | 64 | 64 |
|  | (sheet hardness) | (Shore C) | 95 | 95 | 95 | 95 | 95 | 95 | 95 |
| Intermediate layer-encased sphere | Diameter (mm) |  | 41.5 | 41.5 | 41.5 | 41.5 | 41.5 | 40.7 | 41.5 |
|  | Weight (g) |  | 42.0 | 42.0 | 42.0 | 42.0 | 42.0 | 40.0 | 42.0 |
|  | Deflection (mm) |  | 2.4 | 2.4 | 2.4 | 2.4 | 2.4 | 2.6 | 2.4 |
| Cover | Material hardness | (Shore D) | 41 | 41 | 41 | 41 | 41 | 41 | 41 |
|  | (sheet hardness) | (Shore C) | 64 | 64 | 64 | 64 | 64 | 64 | 64 |
| Coating layer | Material |  | No. 1 | No. 1 | No. 1 | No. 1 | No. 1 | No. 1 | No. 1 |
|  | Hardness (Hc) | (Shore C) | 63 | 63 | 63 | 63 | 63 | 63 | 63 |
| Ball | Diameter (mm) |  | 42.7 | 42.7 | 42.7 | 42.7 | 42.7 | 42.7 | 42.7 |
|  | Weight (g) |  | 45.5 | 45.5 | 45.5 | 45.5 | 45.5 | 45.8 | 45.5 |
|  | Deflection (mm) |  | 2.3 | 2.3 | 2.3 | 2.3 | 2.3 | 2.4 | 2.3 |
| Sheet hardness of cover Coating material hardness | (Shore C) |  | 1 | 1 | 1 | 1 | 1 | 1 | 1 |
| Material hardness of intermediate layer Material hardness of cover | (Shore D) |  | 23 | 23 | 23 | 23 | 23 | 23 | 23 |

The flight performance, spin performance on approach shots and ball diameter of each golf ball were evaluated by the following methods. The results are shown in Table 6.

Flight Performance

A driver (W #1) was mounted on a golf swing robot and the distance traveled by the ball when struck at a head speed of 45 m/s was measured, based on which the flight performance was rated according to the criteria shown below. The club used was the TourB XD-5/Driver (loft angle, 9.5°) manufactured by Bridgestone Sports Co., Ltd. In addition, using an apparatus for measuring the initial conditions, the spin rate was measured immediately after the ball was similarly struck.

Rating Criteria

Good: Total distance was 230.0 m or more
NG: Total distance was less than 230.0 m Spin Rate on Approach Shots A sand wedge (SW) was mounted on a golf swing robot and the spin rate of the ball when struck at a head speed of 22 m/s was measured.

Rating Criteria

Good: Spin rate was 6,200 rpm or more
NG: Spin rate was less than 6,200 rpm

Ball Diameter

After isothermally holding the balls to be measured at 23.9±1° C. for at least 3 hours, the diameters at 15 random dimple-free places were measured, the average of these values was treated as the measurement for one ball, and the average for ten measured balls was determined. Referring to FIG. 6, the procedure in Steps A to D below was carried out as the method for measuring the ball diameter at 15 random dimple-free places. The numbers (1) to (15) at the respective points are indicated in FIG. 6 as circled numbers.

A. Measure the diameters starting at the pole position (1) and continuing up to position (8) at equal intervals.

B. After measuring the diameter at position (8), proceed to the pole position ((directly below position (1)), rotate the ball 90°, and proceed to position (9).

C. Measure the diameters at positions (9) to (15) located at equal intervals.

D. Determine the average of the measurements at positions (1) to (15) and treat this value as the ball diameter.

The Rules of Golf established by the Royal and Ancient Golf Club of St. Andrews (R&A) specify that the ball diameter be such that the ball does not pass through a 1.68 inch (42.672 mm) diameter ring gauge. The golf balls obtained in each of the Examples and Comparative Examples were checked to determine whether they pass through such a ring gauge. The results are shown in Table 6.

TABLE 6

|  |  |  | Example | | | Comparative Example | | | |
| --- | --- | --- | --- | --- | --- | --- | --- | --- | --- |
|  |  |  | 1 | 2 | 3 | 1 | 2 | 3 | 4 |
| Flight | W#1 HS, 45 m/s | Spin rate (rpm) | 2,638 | 2,644 | 2,619 | 2,633 | 2,651 | 2,751 | 2,630 |
|  |  | Total distance (m) | 231.5 | 231.3 | 232.5 | 231.7 | 232.0 | 228.5 | 232.2 |
|  |  | Rating | good | good | good | good | good | NG | good |
| Spin performance on approach shots | SW HS, 22 m/s | Spin rate (rpm) | 6,306 | 6,318 | 6,304 | 6,298 | 6,345 | 6,333 | 6,219 |
|  |  | Rating | good | good | good | good | good | good | good |
| Ball diameter |  | Diameter of smallest portion (mm) | 42.62 | 42.70 | 42.62 | 42.30 | 42.38 | 42.70 | 41.90 |
|  |  | Passes through 42,672 diameter ring gauge (R&A Rules of Golf) | no good | no good | no good | yes NG | yes NG | no good | yes NG |

As demonstrated by the results in Table 6, the golf balls of Comparative Examples 1 to 4 were inferior in the following respects to the golf balls according to the present invention that were obtained in the Examples.

In Comparative Example 1, the gate orifice surface areas in the cover-forming injection mold were small. As a result, the urethane resin material did not spread well throughout the mold cavity and so the ball diameter near the poles ended up being small.

In Comparative Example 2, the gate orifice surface areas in the cover-forming injection mold were large. As a result, too much urethane resin material made its way to the vicinity of the poles within the mold cavity and so the ball diameter near the poles became large and gate marks remained on the seam line, worsening the ball appearance.

In Comparative Example 3, the urethane resin cover was thickly formed. As a result, in terms of the ball performance, the spin rate of the ball on full shots rose and a good distance was not obtained.

In Comparative Example 4, the number of gates in the cover-forming injection mold was too small. As a result, the urethane resin material had difficulty spreading throughout the mold cavity and so the ball diameter near the poles ended up being small.

Japanese Patent Application No. 2019-096976 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for manufacturing a golf ball having a core, an intermediate layer and a cover, the cover being formed of a resin material composed primarily of a polyurethane resin and having a thickness of at least 0.1 mm and up to 0.7 mm, which method comprises the step of injection molding the cover over a spherical insert consisting of the core encased by the intermediate layer with a vertically separating two-part injection mold comprising an upper mold half and a lower mold half that removably mate at a parting line to form a spherical cavity defined by a cavity wall, a plurality of gates for introducing the cover-forming resin material into the spherical cavity and three or more support pins for supporting the spherical insert within the spherical cavity, each support pin being disposed so as to be advanceable and retractable in a direction perpendicular to the mold parting line, wherein six or more of the gates are formed along the mold parting line, each such gate having a surface area where the gate meets the wall of the spherical cavity of 1.25 to 2.70 mm$^2$, wherein each support pin has at an end thereof a cross-sectional shape with a surface area of at least 17 mm$^2$, and the upper mold half and the lower mold half each have six or more support pins.

2. The manufacturing method of claim 1, wherein each support pin is disposed in such a way that the angle of intersection between an axis connecting top and bottom poles of the mold and a normal directed from a center on the axis and toward the cavity wall where the support pin retracts is from 15 to 30°.

* * * * *